United States Patent
Zhao et al.

(10) Patent No.: US 7,792,976 B2
(45) Date of Patent: *Sep. 7, 2010

(54) METHOD, DEVICE AND SYSTEM FOR SHARING APPLICATION SESSION INFORMATION ACROSS MULTIPLE-CHANNELS

(75) Inventors: Shi Wan Zhao, Beijing (CN); Hui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/184,836

(22) Filed: Aug. 1, 2008

(65) Prior Publication Data
US 2009/0055542 A1 Feb. 26, 2009

Related U.S. Application Data (63) Continuation of application No. 10/683,018, filed on Oct. 10, 2003, now Pat. No. 7,433,956.

(30) Foreign Application Priority Data
Oct. 25, 2002 (CN) ................................ 02 1 47184

(51) Int. Cl.
*G06F 15/16* (2006.01)
(52) U.S. Cl. .................. 709/228; 709/227; 709/229
(58) Field of Classification Search .......... 709/227–229
See application file for complete search history.

(56) References Cited

U.S. PATENT DOCUMENTS

| | | | |
|---|---|---|---|
| 6,701,367 B1 | 3/2004 | Belkin | |
| 6,760,324 B1 | 7/2004 | Scott et al. | |
| 6,760,758 B1 | 7/2004 | Lund et al. | |
| 6,839,742 B1 | 1/2005 | Dyer et al. | |
| 6,961,776 B1 | 11/2005 | Buckingham et al. | |
| 7,034,853 B2 | 4/2006 | Cho et al. | |
| 7,051,084 B1 | 5/2006 | Hayton et al. | |
| 7,072,984 B1 | 7/2006 | Polonsky et al. | |
| 7,092,370 B2 | 8/2006 | Jiang et al. | |
| 2002/0013831 A1 | 1/2002 | Astala et al. | |

(Continued)

OTHER PUBLICATIONS

Giguere, The Mobile Developer, Dec. 13, 2000, http://web.archive.org/wed/20001213162300/http://www.wirelessdevnet.com/columns/aug2000/mobdev12.html.

*Primary Examiner*—Hussein A Elchanti
(74) *Attorney, Agent, or Firm*—Scully, Scott, Murphy & Presser, P.C.; Kenneth R. Corsello, Esq.

(57) ABSTRACT

The present invention provides a device for sharing application session information across multiple channels, for managing the communication between terminal devices and a web server, said device comprises an application session manager (ASM) connected between the terminal device and the web server for receiving and forwarding said user's request sent from said terminal device and the response returned from the web sever; a storing device connected to the application session manager, for storing application session management information and application session information in the response returned from the web server; a retrieving device, connected to the application session manager; an intercepting device, connected to the application session manager, for intercepting a new application session information in the response from the web server; said application session manager generates an application session management information (ASMC) of said user, then sends said response to said terminal device which has sent said user's request.

11 Claims, 3 Drawing Sheets

U.S. PATENT DOCUMENTS

| | | |
|---|---|---|
| 2002/0019853 A1 | 2/2002 | Vange et al. |
| 2002/0086275 A1 | 7/2002 | Boney et al. |
| 2002/0087632 A1 | 7/2002 | Keskar |
| 2002/0161833 A1 | 10/2002 | Niven et al. |
| 2002/0197993 A1 | 12/2002 | Cho et al. |
| 2003/0023681 A1 | 1/2003 | Brown et al. |
| 2003/0035617 A1 | 2/2003 | Plourde et al. |
| 2003/0055977 A1 | 3/2003 | Miller |
| 2003/0076367 A1 | 4/2003 | Bencze et al. |
| 2003/0084165 A1 | 5/2003 | Kjellberg et al. |
| 2003/0105819 A1 | 6/2003 | Kim et al. |
| 2003/0208570 A1 | 11/2003 | Lapidous |
| 2004/0002384 A1 | 1/2004 | Multerer et al. |
| 2004/0049673 A1 | 3/2004 | Song et al. |
| 2004/0068567 A1 | 4/2004 | Moran et al. |

METHOD, DEVICE AND SYSTEM FOR SHARING APPLICATION SESSION INFORMATION ACROSS MULTIPLE-CHANNELS

CROSS-REFERENCE TO RELATED APPLICATIONS

This application is a continuation of U.S. Ser. No. 10/683,018, filed on Oct. 10, 2003, the entire contents of which are incorporated herein by reference.

TECHNICAL FIELD

The present invention relates to a method, a device and a system for sharing application session information across multiple-channels when multiple terminals are connected to the same application of the server.

BACKGROUND OF THE INVENTION

Nowadays, people access web contents and applications through an increasing number of client devices such as PDAs, cellular phones, automotive computers, portable computers, as well as traditional PCs. Different devices have their own characters in terms of interface, memory size, network connection, battery power, and so on. People would like to choose appropriate devices/channels to access information at a special environment. For example, a mobile phone user uses speech/voice interface to access web information and do transactions. When moving to a noisy environment, the user would like to switch to a text/GUI interface such as WAP or SMS, for the speech/voice interface does not work. But when she/he goes back to home or office, the best interfacing manner is changed to the traditional PC. But currently no mechanism supports this seamless switch across multiple channels with application session kept at the same time. So, when the user does something in one channel, and then switch to another, or the connection is interrupted and then resumed by the user in the same channel or another, a web application server cannot keep the history for the user and the user must do all things again from the beginning.

Since HTTP is a "stateless" (non-persistent) protocol, it is impossible to discriminate between visitors who access to the same web site, unless the server can somehow "mark" a visitor. This is done by storing a piece of information in the visitor's browser. In traditional three or n-tiered web application architecture, the web application Server maintains application state information (application session information), and browsers keep this session information in cookies, or by means of URL rewriting. This architecture can support single channel access, but not for multi-modal or multi-channel access.

Figure 1:
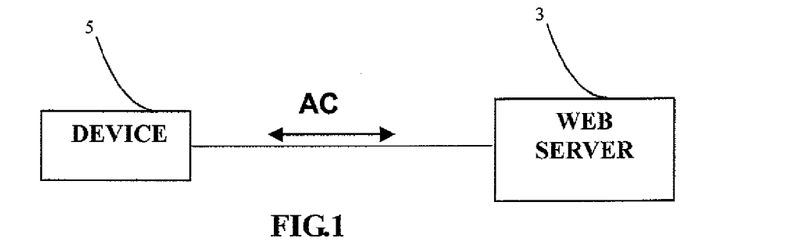
FIG. 1 is a simplified block diagram view of a conventional single channel communication system.

FIG. 1 shows a conventional single channel communication system.

As shown in FIG. 1, the conventional single channel communication system comprises a terminal device 5 (briefly called device in the drawings) and a web server 3. During working time, the terminal device 5 passes application service request to the web server 3, the web server provides application service after receiving said request, such as, web browsing service, web shopping, ticket booking, and so on. During the process of receiving service, the user inputs some user information through the terminal device 5, such as user name, password, and so on. During the process that the terminal device 5 interacts with the web server 3, the web server 3 saves some information associated with the users in the terminal device 5 by means of cookie (described as AC in the drawings). When said terminal device 5 passes request to the web server 3 for the next time, said web server reads previously saved cookie from the memory of the terminal device 5, therefore said web server knows the operations performed by said terminal device 5 and the information associated with the users, so as to provide corresponding and prompt service for the users.

Time can be saved and continuity of application session can be fulfilled by means of cookie. For example, when the users order some product or service, the web server 3 fills out into the table the provided information associated with said user which is extracted from cookie. In addition, if the user performs a series of operations including five steps to the web server 3 through the terminal device 3, after the user performs steps 1-3 through the terminal device 3, the connection to the web server 3 is suspended and disconnected for other reasons, afterwards, the user requests said web server 3 to continue performing said series of operations by means of the same terminal device. Here, said web server 3 reads cookie previously stored in said terminal device 5, so as to enable the user to continue said operations following step 4. The connection between said terminal device 5 and said web server 3 is called a channel. The continuity of session can be guaranteed in a channel by means of cookie. However, if the user has two terminal devices A and B, the user uses the terminal device A to perform said operation steps 1-3, when turns to the terminal device B, said operation cannot be continued at the point of step 4. Because, after steps 1-3, the session information is saved in device A by means of cookie, while device B does not save said information, the web server 3 cannot read said session information from device B. Said operation can only be performed from the very beginning of the steps 1-5 instead of being performed continuously.

To support multi-modal or multi-channel access, a mechanism to share application session information across multiple channels/devices is needed.

To support multi-modal/multi-channel access, since there might be more scenarios such as switch, suspend and resume, etc., there will be more situations of requests than single channel. New request, normal next request, resumption request, switch request and the fragment request need to be distinguished.

SUMMARY OF THE INVENTION

In order to solve the above-mentioned problems, one aspect of the present invention is to provide a method, system and device, to allow the user to select the interface that best suits the current situation, to use wireless or wired devices, and to switch modes of interaction transparently during a single transaction.

Another aspect of the present invention is to provide a method, system and device, to enable the user to either continuously perform the previous unfinished session or start a new session.

To achieve the above-mentioned aspect, the present invention provides a method of sharing application session information across multiple channels or devices, for managing the communication, between terminal devices and a web server, comprising the steps of: receiving a user's request from a terminal device; retrieving a previous application session information of the user, if any, and sending said information with said user's request to the web server in response to said user's request; receiving a response returned from the web server to said terminal device, intercepting new application session information in said response; generating an application session management information of said user, which comprises a device ID of a terminal device which has sent out said user's request; saving both of said intercepted application session information and the generated application session management information; inserting the generated application session management cookie into said response; and sending said response to said terminal device which has sent said user's request.

The present invention also provides a device for sharing application session information across multiple channels or devices, for managing the communication between terminal devices and a web server. The present invention further provides a system for sharing application session information across multiple channels or devices In an embodiment, the device of sharing session information across multiple channels in the present invention is located between the terminal device and the web server, which intercepts the application session information the web server passes to the terminal device, saves and manages this application session information for the user.

BRIEF DESCRIPTION OF THE DRAWING

The present invention will now be described by way of example, with reference to the accompanying drawings, in which.

DETAILED DESCRIPTION OF THE INVENTION

The present invention provides methods, systems and devices, to allow a user to select the interface that best suits the current situation, to use wireless or wired devices, and to switch modes of interaction transparently during a single transaction. The present invention also provides methods, systems and devices, to enable the user to either continuously perform the previous unfinished session or start a new session.

The present invention further provides methods of sharing application session information across multiple channels or devices, for managing the communication between terminal devices and a web server. An example embodiment comprises the steps of: receiving a user's request from a terminal device; retrieving a previous application session information of the user, if any, and sending said information with said user's request to the web server in response to said user's request; receiving a response returned from the web server to said terminal device, intercepting new application session information in said response; generating an application session management information of said user, which comprises a device ID of a terminal device which has sent out said user's request; saving both of said intercepted application session information and the generated application session management information; inserting the generated application session management cookie into said response; and sending said response to said terminal device which has sent said user's request.

The present invention also provides a device for sharing application session information across multiple channels or devices, for managing the communication between terminal devices and a web server, comprising: an application session manager (ASM) connected between a terminal device and the web server, for receiving and forwarding said user's request sent from said terminal device and the response returned from the web sever, a storing device connected to the application session manager, for storing application session management information and application session information in the response returned from the web server; a retrieving device connected to the application session manager; an intercepting device connected to the application session manager; wherein, said application session manager receives said user's request sent from said terminal device to the web server; according to said user's request, controls said retrieving device to retrieve a previous application session information of said user from the storing device; then sends the retrieved application session information with said user's request to the web server, after said application session manager receives the response returned from the web server to said terminal device, the intercepting device intercepts a new application session information in said response, said application session manager generates an application session management information of said user, wherein the application session management information comprises a device ID for identifying said terminal device which has sent said user's request; then, sends said response with the application session management information to said terminal device which has sent said user's request.

The present invention further provides a system for sharing application session information across multiple channels or devices, comprising one or more terminal devices and at least one web server, characterized in that said system comprises a device for sharing application session information across multiple channels or devices, which is connected between said one or more terminal devices and said web server, and comprises: an application session manager (ASM) connected between a terminal device and the web server, for receiving and forwarding said user's request sent from said terminal device and the response returned from the web sever, a storing device connected to the application session manager, for storing application session management information and application session information in the response returned from the web server; a retrieving device connected to the application session manager; an intercepting device connected to the application session manager; wherein, said application session manager receives said user's request sent from said terminal device to the web server, according to said user's request, controls said retrieving device to retrieve a previous application session information of said user from the storing device; then sends the retrieved application session information with said user's request to the web server, after said application session manager receives the response returned from the web server to said terminal device, the intercepting device intercepts a new application session information in said response, said application session manager generates an application session management information of said user, wherein the application session management information comprises a device ID for identifying said terminal device which has sent said user's request; then, sends said response with the application session management information to said terminal device which has sent said user's request.

More specifically, the device of sharing session information across multiple channels in the present invention is located between the terminal device and the web server, which intercepts the application session information the web server passes to the terminal device, saves and manages this application session information for the user. The application session information is saved in the device of sharing session information across multiple channels instead of directly sent to the terminal device. When the user accesses the application on the web server from different terminal devices, the device of sharing session information across multiple channels locates and restores the application session information for the user, so as to fulfill mat the application session information is shared on multiple terminal devices.

1. The device of sharing session information across multiple channels receives a request, identifies a user and creates an entry into a ASM database for the user, then passes said request to the server.

2. The server receives a request from the device of sharing session information across multiple channels, and generates a response.

3. The device of sharing session information across multiple channels gets the response back from the server, intercepts the application session information included in the response, and saves it in the ASM database. An ASMC is generated for the same time, and inserted into the response and sent to the user device, for example, by means of cookie, or by means of URL rewriting, which is wide known for those skilled in the art.

4. When the next user requests to get to the device of sharing session information across multiple channels, if the request includes ASMC, the device of sharing session information across multiple channels will find a corresponding AC, and replace ASMC with AC, then send the request to the server.

5. The server generates a response.

6. The device of sharing session information across multiple channels gets a response for each time, it will intercept AC in said response, then update the ASM database.

7. The device of sharing session information across multiple channels passes the response to the user device.

8. When me user accesses with another device (it may be a access with multiple devices for the same time, or an access in sequence), the device of sharing session information across multiple channels identifies this user, restores the corresponding AC related with said user from database if said user is located in the ASM database, and adds AC to the request, passes it to the server.

9. The server generates a response.

10. The device of sharing session information across multiple channels gets a response for each time, it will intercept AC in said response, then update the ASM database. Meanwhile, the device of sharing session information across multiple channels generates a new ASMC for this new device and adds it to the response.

11. The device of sharing session information across multiple channels passes said response back to the user.

According to the method, device and system of the present invention, session information can be shared between multiple devices, the users can select the interface that best suits the current situation, use wireless or wired devices, and switch modes of interaction transparently during a single transaction.

A method, system and device for multiple terminals to share session information across multiple channels according to the present invention (hereinafter, called a method, system and device for sharing session information across multiple channels) will now be described in detail with reference to the accompanying drawings.

Figure 2:
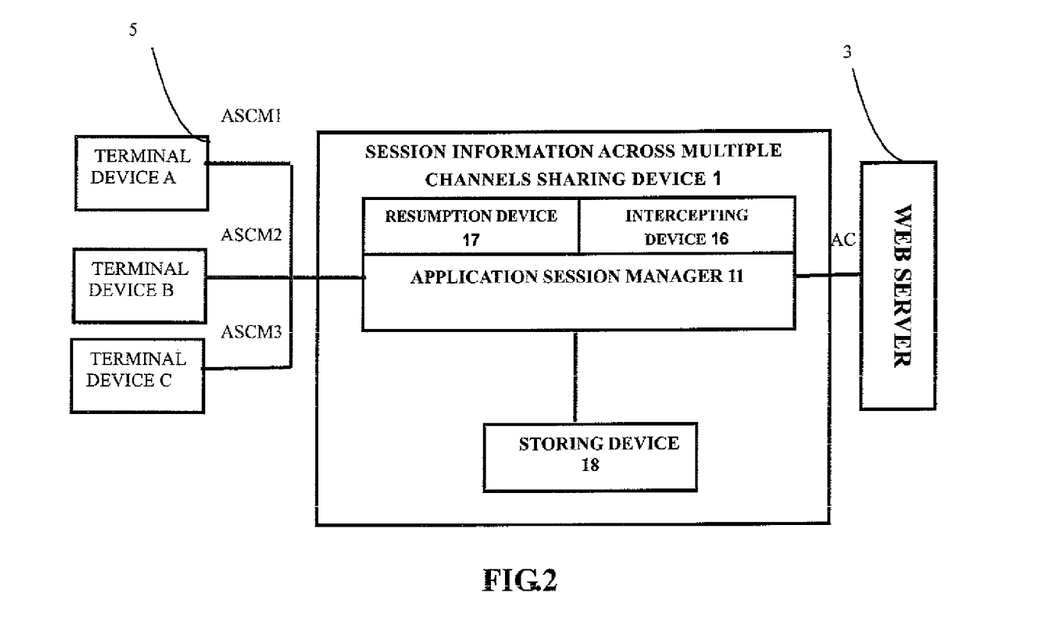
FIG. 2 is a simplified block diagram view of the system for sharing session information across multiple channels according to the present invention.

FIG. 2 shows the idea of the present invention. The present invention is a multiple-channel communication system for multiple terminals to share application session information across multiple channels, by taking a multiple-channel session information sharing device 1 as a middle-ware between terminal devices A, B and the web server 3. The system of fee present invention enables multiple terminal devices or channels to access the same application at the same time, or access the same application in sequence.

As shown in FIG. 2, according to the present invention, the multiple-channel communication system comprises multiple terminal devices 5 (the three devices A, B and C shown in the drawings), a session information across multiple channels sharing device 1 and a web server 3. During working time, the terminal device 5 (A, B or C) passes an application service request to the session information across multiple channels sharing device 1, said session information across multiple channels sharing device 1 transmits said request to the web server 3. Then the web server 3 passes AC information back to the session information across multiple channels sharing device 1, the intercepting device 16 in the session information across multiple channels sharing device 1 intercepts said AC information, and the application session manager 11 manages this AC information for the terminal device and generates a multiple-fragments (may be one fragment) cookie, which is also called ASMC (it is called "application session management cookie" in the present text). The application session manager 11 passes the ASMC to the terminal device 5 instead of passing the AC to the terminal device 5. The session information across multiple channels sharing device 1 saves the corresponding relationship between the AC and the ASMC in a storing device 18. When the user requests to get to the session information across multiple channels sharing device 1 from the terminal device 5, according to the corresponding relationship, the session information across multiple channels sharing device 1 restores the application session information AC from the storing device 18 through the retrieving device 17, and replaces the ASMC with the corresponding AC. In multiple session applications, the ASMC can be divided into fragments, for examples two fragments, the first fragment being determined by a Session ID, the second fragment being corresponding to different devices/channels. The same session time can be expressed by the same Session ID, and the second fragment related with the device is unique to each device. Therefore, the ASMC, which is formed by the first fragment and the second fragment, enables different devices corresponding to the same session time. In the drawings, ASMC 1 is corresponding to device A, ASMC 2 is corresponding to device B, and ASMC 3 is corresponding to device C. Sharing the AC between multiple devices 5 can be fulfilled by the session information across multiple channels sharing device 1. Based on the session information across multiple channels sharing device 1, multiple terminal devices 5 or channels can access the same application for the same time or continuously in sequence. A simple example related with the formation ASMC is as follows:

|  | Part one (Session ID) | Part two (related with device) |
| --- | --- | --- |
| ASMC1 | A12def83 | 10983208 |
| ASMC2 | A12def83 | 20980980 |
| ASMC3 | A12def83 | 31238080 |

In the table above, the first parts of the three ASMC are same, indicating that the three devices are in the same session time. We assume that a user performs a series of operations including five steps to the web server 3 through the terminal device A. After the user performs steps 1-3 by using the terminal device A, the connection to the web server 3 is suspended and disconnected for some reasons. At this time, the communication state information between device A and the web server 3 is saved in the session information across multiple channels sharing device 1. When said user accesses the session information across multiple channels sharing device 1 through another terminal device B, the session information across multiple channels sharing device 1 can identify that said user is identical with the user of previous operation device A through a series of authenticating or logging, so as to allocate the state information AC related with previous operations from database, and inquire whether said user continues the previous operations or resume other operations. If the user requests to continue the previous operations, the session information across multiple channels sharing device 1 communicates with the web server 3 by using the session information after the previously performed steps 1-3, so as to continue performing steps 4 and 5 to finish the whole operations.

Obviously, associated with the communication which does not need to be discriminated by sessions, the ASMC cookie does not need any fragment which expresses sessions; therefore, said fragment is dispensable.

Figure 3:
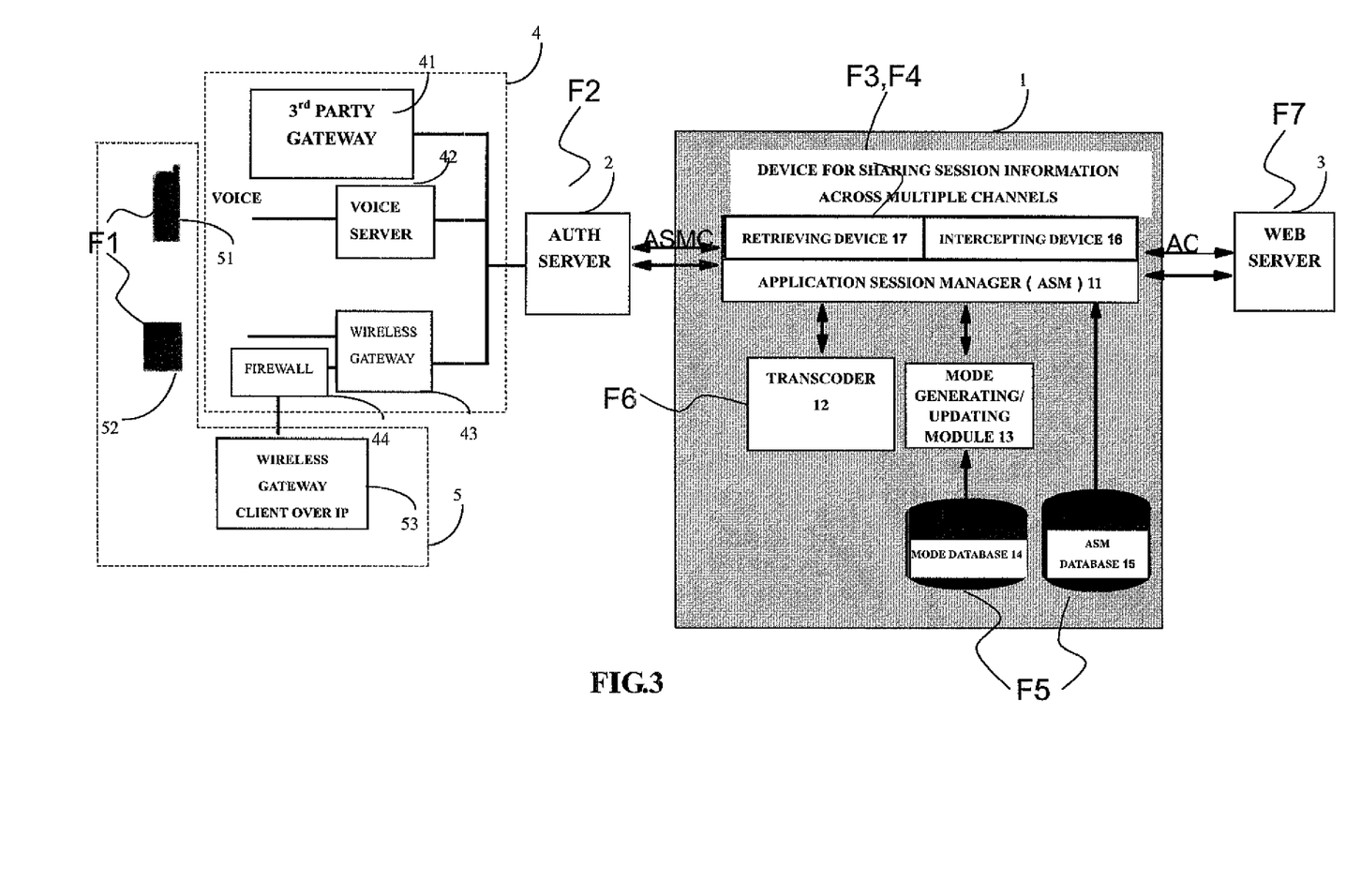
FIG. 3 is a simplified block diagram view of a system for sharing application session information across multiple channels between a plurality of terminal devices according to the present invention.

The following is the specific system structure according to the present invention as shown in FIG. 3. The system of the present invention comprises five parts; a session information across multiple channels sharing device 1, an auth server 2, a web server 3, a communicating channel 4, a terminal device 5. The terminal device 5 is connected to the auth server 2 through the communicating channel 4, the auth server 2 is connected to the session information across multiple channels sharing device 1, and the session information across multiple channels sharing device 1 is connected to the web server 3. The terminal device 5 includes cellular phones, PCs, PDAs, etc., by which the user performs web access and operation, for example, the three terminal devices as shown in FIG. 3, i.e. cellular phone 51, PDA 52 and wireless gateway client over IP 53. Each terminal device 5 is connected to the auth server 2 through the communicating channel 4. For example, these communicating channels comprise a third party gateway 41, a voice server 42, a wireless gateway 43 and a firewall 44.

The session information across multiple channels sharing device 1 comprises: an application session manager 31 for determining request type of the user and performing corresponding procession according to the request type; a transcoder 12 for transforming the format of the page; a mode generating/updating module 13 for generating and updating the mode, when receiving the page returned from the server, the application session manager will transfers the mode generating/updating module 13, which extracts the mode from the page (the table data entered by the user in the page), when the user submits data, the application session manager will transfers the mode generating/updating module 13, which updates the mode with the data submitted by the user; a mode database 14 for saving the history data of the user, when the user's device is reconnected to the system, the previous data can be seen, the application session manager 11 transfers said mode to generate updating module 13 to operate said mode database 14; an application session management database 15 for saving user state, visited URL, application state and session information (such as cookie) etc.; an intercepting device 16 for intercepting application session information in the response from the web server; and a retrieving device 17 for restoring application session information AC from database.

The application manager 13, the intercepting device 16 and the retrieving device 17 are connected to each other.

An auth server 2 between the terminal device 5 and the session information across multiple channels sharing device 1 is used for authenticating the user when HTTP request from a user in enters, and for adding user information to the HTTP request to be used by the session information across multiple channels sharing device 1 after passing the authentication.

The following describes the function of each section and the relationship between them in the session information across multiple channels sharing device 1 and their connection relationships. First, the application session manager 11 is connected to the auth server 2, for receiving the request with additional user information from the auth server 2, and determining the request type of said user, and performing corresponding process according to the request type. Normally, the user's requests are divided into five types:

1. First request: when a user requests to enter the session information across multiple channels sharing device 1, if the application session manager 11 does not find any history record applied to said web by said user from the mode database 14 and the ASM database 15, then said request is determined to be a first time request.

2. Normal next request besides a first time request, the user performs a series of sequential requests to the application in the web server 3 through the same device (browser).

3. Resumption request: when the user finishes a certain work, actively or passively shut down the connection to the web server 3. Then the user uses the same device or other different device to reconnect, and request to continue performing the operations being disconnected for the last time. Such a resumption request is called resumption request.

4. Partial submit request before finishing a certain operation to a page, the user may actively save these data by a certain operation, if he/she wants to save input data.

5. Fragment request: said request is caused by that event that the transcoder 12 divides a large page into several small pages, these small pages are saved in the database of the session information across multiple channels sharing device 1 with connection to each other, when the user requests for these small pages in the database of the session information across multiple channels sharing device 1 (different from the page of the web server 3), said request is called fragment request.

To discriminate said request types, the application session manager 11 will generate a cookie (ASMC), or by means of URL rewriting (for simplification, it is also called ASMC hereinafter). The meaning of URL rewriting is to rewrite all the URL in the page back from server, to add session information to each URL, when the user request for the second time by clicking the link in said page, the URL of said request will comprise session information, so as to fulfill the same function as cookie. So, the application session manager 11 will discriminate a first time request, the resumption request and the normal next request from each other, because the normal next request will comprise ASMC.

The application session manager 11 will save visiting record for each web application related with each user, so the application session manager 11 can discriminate a first time request from the resumption request.

The partial submit request and the fragment request comprise a special ID, so the application session manager 11 can identify them.

The application session manager 11 is connected to the transcoder 12, for transforming the page from the web server 3 to the format of the terminal device and pass it to the corresponding terminal device through the application session manager 11. The application session manager 11 is connected to the ASM database 15, and saves the user's state, the visited URL, the application state and the session information in the ASM database 15. The application session manager 11 is connected to the mode generating/updating module 13, which is farther connected to the mode database 14; the mode generating/updating module 13 generates data and updates mode, and saves the history data submitted by the user in the mode database 14.

Figure 4:
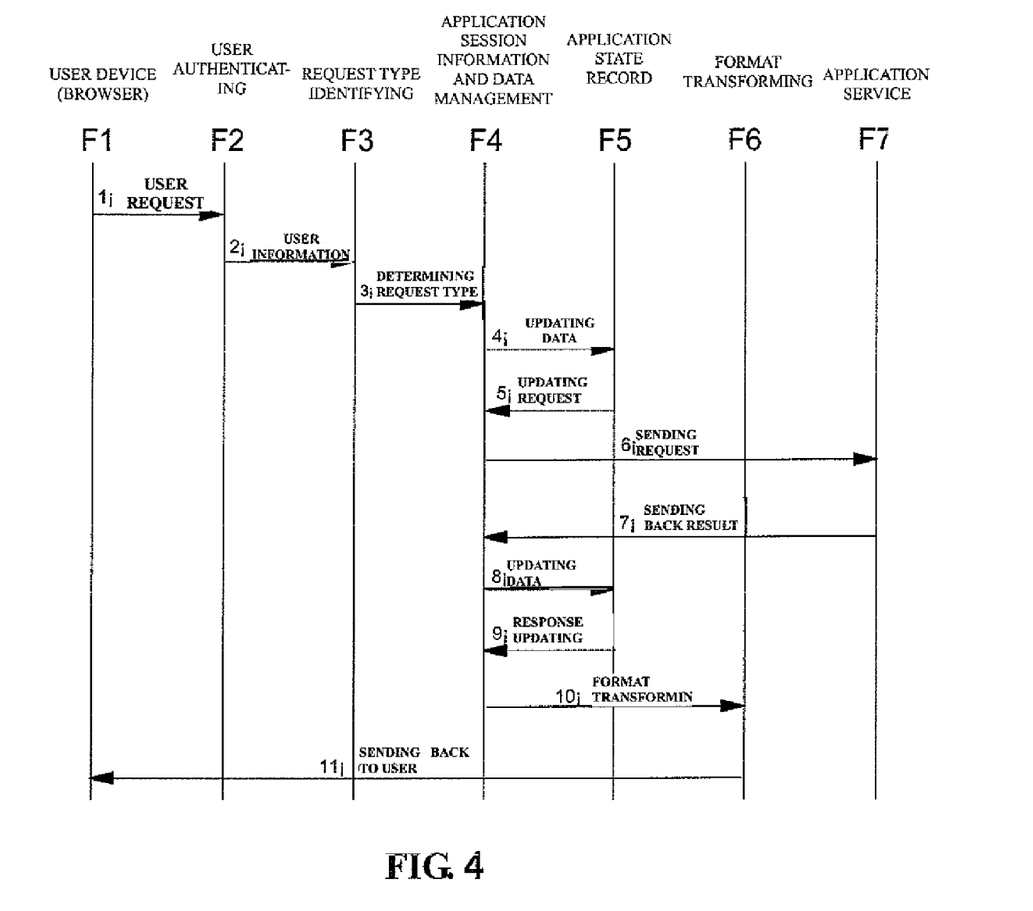
FIG. 4 is a sequence diagram of a method for sharing session information across multiple channels according to the present invention.

The following is the description of the whole system operation flow associated with FIG. 4. Firstly, in order to facilitate the description, according to the function of each member in FIG. 3, the operation flow is divided into several phrases, which are expressed by F1-F7. F1 denotes terminal device phase, F2 denotes user authenticating phase, F3 denotes request type identifying phase, F4 denotes application session information and data management phase, F5 denotes application state recording phase, F6 denotes format transforming phase and F7 denotes application service phase. F1 is performed in the terminal device 5, F2 is performed in the auth server 2, F3 and F4 are performed by the application session manager 11, F6 is performed in the transcoder 12, F5 is performed in the mode database 14 and the mode generating/updating module 13, and F7 is performed in the web server 3. The data exchange and steps between each phase are described by numbers 1-11 in FIG. 4. These steps are specifically described as follow:

1. During phase F1, a user inputs a certain URL into the browser of the terminal device 5 to visit some web applications, the browser will pass said user's request to the following auth server 2.

2. During phase F2, the auth server 2 requests the user to provide a user name and a password, the auth server 2 will insert said user information into said request after authenticating, to provide the use for the following modules.

3. After the application session manager 11 receives said request, during phase F3, determines to which request type the user's request for said application belongs, according to user information and URL.

4. During phase F4, the application session manager 11 takes corresponding measurement according to the request type. If the request does not belong to the resumption type, and comprises data, then the application session manager 11 extracts data from the request, and updates the database during phase F5.

5. Then, the application session manager 11 amends the request according to request type:
   a. if it belongs to resumption request type, reconstructing request according to application state;
   b. if there is a proper application cookie, inserting it into request;
   c. updating request by data in database.

6. Sending the user's request to the backend web server 3.

7. The web server 3 returns the corresponding response.

8. The application session manager 11 extracts an application cookie from the response back, and saves it in the database. If the page comprise initial data which has no history data corresponding to the page, extracts data and updates database.

9. If the history data of said page exists, updating said page by said data, meanwhile generating ASMC related with a first time request and resumption request (or by means of URL rewriting) and inserting into the response.

10. The transcoder 12 transforms the page format of the web server 3 into the page format requested by the user.

11. Passing the transformed page back to the user.

By now, one turn operation is finished.

The system operation flow will be described hereinafter, according to a simple web application example. An application is supposed to be consisted of four web pages: welcome.html, survey1.jsp, survey2.jsp, coupon.jsp.

The first lap:

1. The user opens WAP browser of cellular phone on the shuttle (outside mobile environment), and inputs the web address: http://www.crl.ibm.com/demo/welcome.html 2. Said request is sent to the auth server 2. The auth server 2 requests the user to input a user name and a password. After the user inputs correct user name and password, the auth server 2 adds the user information to said request and sends said request to the session information across multiple channels sharing device 1.

3. The core portion of the session information across multiple channels sharing device 1 is the application session manager 11 (ASM). The ASM 11 extracts user information and URL requested by the user from said request, obtains web application sought to be visited by the user according to requested URL. Inquiring the mode database 14 and the ASM database 15 according to this information, to see whether said user has history record applied to said web, (if null, it is a first time request of said user), the ASM 11 determines that said request type is "a first time request", and sends said request to the backend web server 3.

4. After the application session manager 11 gets corresponding page from the backend web server 3, performing corresponding operations to said response (formed by page and response header):
   a. intercepting the cookie information (AC) from the web server 3←
   b. The application session manager 11 can generate session information by two means:
      i. The application session manager 11 generates a cookie per se, which is called ASMC, adds this cookie onto the response header and sends it back to the user;
      ii. The application session manager 11 may save the session information generated by itself in the page which is sent back, by means of URL rewriting;
   c. Updating this information into the ASM database 15;
   d. If the page sent back includes HTML table, extracting the initial value from the table and saving it into the mode database 14;
   e. Transferring it to the transcoder 12 and transforming the page sent back if necessary. Said transformer will transfer the HTML page sent back to WML format;
   f. Due to the limit of the cellular phone per se, WAP browser can only accept a page with a certain size. Therefore, said transformer further divides WML page into several small pages according to the parameter of cellular phone (each small page is called a WML deck), the size of deck is determined by the parameter of cellular phone. Supposing there are two decks in this example. Saves these decks in database, each deck can be retrieved by only one URL.

5. The application session manager 11 sends the first deck of WML format back to the user.

The second lap

1. After the user brows a deck, click continue, request for the next deck.

2. Said request is passed to the auth server 2, because said user has been authenticated, the auth server 2 adds said user information to said request, and passes said request to the session information across multiple channels sharing device 1.

3. The ASM 11 of the session information across multiple channels sharing device 1 determines said request type is "fragment request" according to the special URL form.

4. The ASM 11 gets corresponding page from the web server 3, performs some corresponding operations to said response:
   a. Extracts the data submitted by the user from said request, and uses these data to update new mode database 14;
   b. According to the URL requested by the user, gets corresponding deck from the ASM database 15 and sends its back to the user.

The third lap:

1. After the user browses the second deck, click submit, and requests for the next page: http://www.crl.ibm.com/demo/survey1.jsp.

2. Said request is sent to me auth server 2, because said user has been authenticated The auth server 2 adds said user information to said request, and passes said request to the session information across multiple channels sharing device 1.

3. The ASM 11 in the session information across multiple channels sharing device 1 determines said request type is "normal next request", because said user saves the history record of said web application in the ASM database 15. Furthermore, said request includes the session information set in the first lap (the request header has ASMC, or session information by means of URL rewriting).

4. The ASM 11 performs some processions to said request:
   a. Extracts the data submitted by the user from said request, and uses these data to update new mode database 34;
   b. Then adds the complete data of the mode database 14 into the request;
   c. Adds proper application cookie into the request;
   d. Passes said request to the backend web server 3.

5. The ASM 11 gets corresponding page from the backend web server 3, performs some corresponding operations:
   a. Intercepts cookie information returned from the web server 3;
   b. If the previous ASM 11 transfers session information by means of URL rewriting, the URL rewriting is also needed here;
   c. Updates this information into the ASM database 15;
   d. If the mode database 14 has previously input value corresponding to said page, and updates the page with this value. Otherwise, if the mode database 14 has no corresponding data, and the page sent back includes some initial values, extracts these values and saves them into the mode database 14;
   e. Transferring them to the transcoder 12 to transform HTML page to WML format.

The fourth lap

1. The user requests for the next page http//www.crl.ibm.com/demo/survey2.jsp.

At this time the user go to home, or to the office, inputting by PC makes him feel better, then he shut down the cellular phone and opens the browser in PC.

The fifth lap:

1. Use opens IE browser and inputs web address http://www.crl.ibm.com/demo/welcome.html.

2. Said request is passed to the auth server 2. The auth server 2 requests the user to input a user name and a password. After the user inputs correct the user name and password, the auth server 2 adds the user information into said request, and sends the request to the session information across multiple channels sharing device 1.

3. The ASM 11 of the session information across multiple channels sharing device 1 extracts the user information and fee URL requested by the user from said request, inquiries the ASM database 15 according to this information, and an unfinished record does exist. Meanwhile, there is no ASMC in me user's request (it can be obtained from the user's request by means of URL rewriting); therefore, the ASM determines said request is "resumption request" type.

4. Because of "resumption request", the ASM 11 will extracts corresponding information from the ASM database 15, and constructs a new request:
   a. Replacing URL of said request with URL the user last visits: http://www.crl.ibm.com/demo/survey2.jsp←
   b. Adding an application cookie into the request;
   c. Passing said request to the backend web server 3 (it can be obtained from the buffer as well);

5. The ASM 11 obtains corresponding page from the web server 3, performs some corresponding operations to said response (formed by page and response header):
   a. Intercepting cookie information (application cookie) returned from the server 3;
   b. The ASM 11 generates a new session information by two means:
      i. The ASM generates a cookie per se which is called ASMC, adding it to the response header sent back, and passing it back to the user;
      ii. The ASM 11 may save the session information generated by itself in the page sent back by means of URL rewriting;
   c. Updating this information into the ASM database 15;
   d. Updating said page with the data input by the user in the mode database 14. Thus, the user can see that the previously input data with WAP cellular phone;
   e. In this event, what is requested and sent back are all HTML page, so the transcoder 12 does nothing.

6. The ASM 11 sends said page back to the user.

It can be seen from said system embodiment, the present system fulfills the share of session information between different devices (browser). Meanwhile, saves different states of application, such as current URL, the data submitted by the user, etc. So that operating on the same web application, the user can select proper device to operate according to the environment and favorite. When environment is changed, the devices in use can be freely switched. For example, the user may use portable device in mobile environment, use PC at home or in office, use voice to input in a quite environment, use text to input in a noisy environment. Meanwhile, data of application on different devices shall be kept synchronous and continuous.

While embodiments of the present invention have been described, additional variations and modifications in those embodiments may occur to those skilled in the art once they learn of the basic inventive concepts. Therefore, it is intended that the appended claims shall be construed to include both these embodiments and all such variations and modifications as fall within the spirit and scope of the invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A device for sharing application session information across multiple channels or devices for managing the communication between terminal devices and a web server, said device comprising:

an application session manager (ASM) connected between a terminal device and the web server, for receiving and forwarding said user's request sent from said terminal device and the response returned from the web sever;

a storing device connected to the application session manager, for storing application session management information and application session information in the response returned from the web server;

a retrieving device connected to the application session manager;

an intercepting device connected to the application session manager;

wherein, said application session manager receives said user's request sent from said terminal device to the web server;

according to said user's request, controls said retrieving device to retrieve a previous application session information of said user from the storing device, said application session manager further finding an application cookie corresponding to said previous application session information if said previous application session information is included in said user's request and sending said user's request with said application cookie to the web server, and if there is no previous application session information in said user's request, determining if there exists an unfinished record associated with the user in the storing device, said unfinished record being associated with a device ID that is different from a device ID of the terminal device which has sent out said user's request, and if there is an unfinished record, constructing a new request using application session management information associated with the user and replacing said user's request with the new request and sending said new request to the web server in response to said user's request;

after said application session manager receives the response returned from the web server to said terminal device, the intercepting device intercepts a new application session information in said response, said application session manager generates an application session management information of said user, wherein the application session management information comprises at least a first fragment identifying a session ID and a second fragment identifying a device ID for identifying said terminal device which has sent said user's request wherein multiple application session management information can exist having the same session ID for different device IDs;

then, sends said response with the application session management information to said terminal device which has sent said user's request.

2. The device according to claim 1, wherein said application session manager retrieves a previous application session information of said user according to application session management information (ASMC) of said user's request.

3. The device according to claim 1, wherein the application session management information further comprises a session ID for identifying the session time of said user.

4. The device according to claim 1, characterized in that said user's request does not comprise the application session management information, and said previous application session information is null.

5. The device according to claim 1, characterized in that an authenticating and authorizing server authenticates said user ID of said terminal device and authorizes said user, before said application session manager receives said user's request sent by said terminal device.

6. The device according to claim 5, characterized in that the authenticating and authorizing server authenticates the user by requesting said user to input the user name and the password, and authorizes the corresponding user.

7. The device according to claim 1, characterized in that said application session manager identifies the request type from said terminal device and performs corresponding session management associated with different request types, after receiving said user's request sent from said terminal device.

8. The device according to claim 1, characterized in that said application session information comprises user submitted history data, user state, visited URL, application state or cookie.

9. The device according to claim 1, characterized in that the code converter, which is connected to said application session manager, converts the information from the web server into an information format which can be accepted by said terminal device, if the information format used by said terminal device is different from the information format used by the web server.

10. A system for sharing application session information across multiple channels or devices, comprising one or more terminal devices and at least one web server, wherein said system comprises a device for sharing application session information across multiple channels or devices, which is connected between said one or more terminal devices and said web server, and comprises:
an application session manager (ASM) connected between a terminal device and the web server, for receiving and forwarding said user's request sent from said terminal device and the response returned from the web sever;
a storing device connected to the application session manager, for storing application session management information and application session information in the response returned from the web server;
a retrieving device connected to the application session manager,
an intercepting device connected to the application session manager;
wherein, said application session manager receives said user's request sent from said terminal device to the web server;
according to said user's request, controls said retrieving device to retrieve a previous application session information of said user from the storing device, said application session manager further finding an application cookie corresponding to said previous application session information if said previous application session information is included in said user's request and sending said user's request with said application cookie to the web server, and if there is no previous application session information in said user's request, determining if there exists an unfinished record associated with the user in the storing device, said unfinished record being associated with a device ID that is different from a device ID of the terminal device which has sent out said user's request, and if there is an unfinished record, constructing a new request using application session management information associated with the user and replacing said user's request with the new request and sending said new request to the web server in response to said user's request;
after said application session manager receives the response returned from the web server to said terminal device, the intercepting device intercepts a new application session information in said response, said application session manager generates an application session management information of said user, wherein the application session management information comprises at least a first fragment identifying a session ID and a second fragment identifying a device ID for identifying said terminal device which has sent said user's request wherein multiple application session management information can exist having the same session ID for different device IDs;
then, sends said response with the application session management information to said terminal device which has sent said user's request.

11. A program storage device readable by machine, tangibly embodying a program of instructions executable by the machine to perform method steps for sharing application session information across multiple channels or devices, for managing the communication between terminal devices and a web server, said method steps comprising;
receiving a user's request from a terminal device;
identifying a user and creating an entry associated with the user into an application session management database;
retrieving a previous application session information of the user in said user's request, if any, and finding an application cookie corresponding to said previous application session information of the user in said user's request and replacing said previous application session information with said application cookie and sending said user's request with said application cookie to the web server in response to said user's request, and if there is no previous application session information of the user in said user's request, determining if there exists an unfinished record associated with the user in the application session management database, said unfinished record being associated with a first device ID that is different from a second device ID of the terminal device which has sent out said user's request, and if there is the unfinished record, constructing a new request using application session management information associated with the user in the application session management database and replacing said user's request with the new request and sending said new request to the web server in response to said user's request;
receiving a response returned from the web server to said terminal device, intercepting a new application session information in said response;
generating a new application session management information of said user, which comprises at least a first fragment identifying a session ID and a second fragment identifying the second device ID of the terminal device which has sent out said user's request, wherein multiple application session management information can exist having the same session ID for different device IDs;
saving both of said intercepted application session information and the generated application session management information;
replacing said intercepted application session information with the generated application session management information into said response; and
sending said response to said terminal device which has sent said user's request.

* * * * *